United States Patent [19]

Fischer

[11] Patent Number: 4,645,810
[45] Date of Patent: Feb. 24, 1987

[54] ADHESIVE BONDING

[75] Inventor: Eleonore Fischer, Frankfurt am Main, Fed. Rep. of Germany

[73] Assignee: USM Corporation, Flemington, N.J.

[21] Appl. No.: 753,887

[22] Filed: Jul. 11, 1985

[30] Foreign Application Priority Data

Aug. 23, 1984 [GB] United Kingdom ............... 8421412

[51] Int. Cl.$^4$ ................................................ C08F 2/02
[52] U.S. Cl. .................................... 526/204; 525/259; 526/213; 526/216; 526/220
[58] Field of Search ............... 525/261, 262, 285, 193; 526/204, 213, 270, 320, 323.1, 323.2, 329.7

[56] References Cited

U.S. PATENT DOCUMENTS

| 3,890,407 | 6/1975 | Briggs et al. | 525/193 |
| 4,343,921 | 8/1982 | Piestert | 526/323.2 |
| 4,569,976 | 2/1986 | Zimmerman et al. | 526/323.1 |

Primary Examiner—Paul R. Michl
Attorney, Agent, or Firm—Thomas S. Szatkowski

[57] ABSTRACT

A method of forming an adhesive bond between substrates at least one of which comprises a surface of zinc is described and claimed. The method comprises applying to one or more of the substrates to be bonded an adhesive composition comprising polymerizable acrylic monomer, free radical initiator, thiourea accelerator compound and an organic dibasic acid compound which is a dibasic acid or dibasic acid anhydride, and bringing the substrates together to form an adhesive bond. Compositions described permit improved adhesion to zinc surfaces and preferably include methyl methacrylate or tetrahydrofurfuryl methacrylate, a hydroxymethacrylate and a dimethacrylate. Preferred dibasic acid compounds include succinic acid and maleic acid.

9 Claims, No Drawings

ADHESIVE BONDING

BACKGROUND OF THE INVENTION

This invention is concerned with forming an adhesive bond between substrates at least one of which comprises a surface of zinc.

Adhesive compositions have been proposed based on polymerisable acrylic monomers which are polymerisable in absence of oxygen but which are at least substantially stable when stored in presence of oxygen. These adhesives are frequently referred to as anaerobic adhesives. Anaerobic adhesives are fundamentally single part compositions polymerisable primarily through exclusion of oxygen therefrom. They are chiefly known for screw fastening applications. The polymerisation of anaerobic adhesives comprising acrylate or methacrylate monomer is generally initiated by free radical creating compounds e.g. peroxy compounds, contained in the adhesive. Cure of the adhesive composition occurs at room temperature under anaerobic conditions i.e. by the exclusion of oxygen between the substrates to be bonded, for example by screwing a screw into a suitable holder, after applying adhesive composition to one or both components. Such adhesive compositions remain stable at room temperature in the presence of oxygen which inhibits the radically induced polymerisation reaction.

The polymerisation of anaerobic adhesive compositions may be accelerated by accelerator compounds which promote the production of free radicals from the free radical initiator. The accelerator compounds must be stored separately from the free radical initiator before use to prevent premature cure of the composition, and frequently they are supplied as a solution for application to one or both of the surfaces to be bonded as a primer, prior to the application of the adhesive composition. Examples of accelerator compounds include butyraldehyde-aniline condensation products, for example those commercially available from Du Pont under the trade name 'Accelerator 808' or from R. T. Vanderbilt Comp. Inc. under the trade name 'Vanax 808'.

It has been proposed to employ adhesives based on esters of acrylic or methacrylic acid for use in the field of so called structural adhesives where bonds of high strength and quality in terms of shear, peel, temperature resistance and hydrolysis resistance etc. are required. However, anaerobic adhesives generally fall short of required performance standards in one or more of the required strength or quality aspects of the bonds formed. It has been proposed to employ accelerators in a part of a multipart adhesive composition based on polymerisable acrylic monomers kept separate from the part of the composition containing the free radical initiator, and in this way it is possible to produce adhesives capable of producing bonds to many substrates which are of high strength and quality. For example a polymerisable adhesive composition based on a polymeric component and a monomer mixture comprising 2-hydroxy ethyl methacrylate or 2-hydroxyl propyl methacrylate and a $C_{1-4}$ alkyl methacrylate together with a reducing agent and an organic hydroperoxide is described in UK No. 1544006. Various examples of reducing agents are mentioned, including metallic soaps, toluidine compounds, thioamides, thiourea, ethylene thiourea, tetramethylene thiourea and mercaptobenzoimidazole. Such compositions are said to exhibit rapid curing to provide bonds of high tensile shear strength on metal surfaces, for example steel and iron. However, prior to the present invention, we have not been aware of an adhesive composition based on polymerisable acrylic monomers capable of providing bonds of high strength and quality, particularly as exemplified by shear strength, to zinc surfaces for example zinc plated steel.

Among more active accelerators which have been proposed for use with polymerisable acrylic ester based adhesives are compounds containing S- and N- groupings, in particular thioureas for example thiourea, N.N'-dicyclohexyl thiourea and 1-allyl-2-thiourea. The acceleration efficiency of certain thioureas on the radical polymerisation of methyl methacrylate, in solution in presence of certain peroxides and hydroperoxides was investigated in detail by Takaaki Sugimura et al and published in the Journal of Polymer Science at Part A-1 Vol. 4, 2735–2746(1966) (which refers inter alia to Journal of Polymer Science Part A Vol. 3 2935–2945 (1965), and Part A-1 Vol. 4, 2721–2734 (1966)).

It is among objects of this invention to provide improved adhesive bonding to zinc surfaces.

BRIEF SUMMARY OF THE INVENTION

It is known in the art that acids may be added to adhesive compositions comprising reactive acrylic monomer, as adhesion promotors. The acids most commonly employed in the art as adhesion promotors include acrylic acid and methacrylic acid. It has been found however, that the tensile shear strength of bonds formed on zinc surfaces is not improved significantly by the inclusion of these monobasic acids as adhesion promotors in adhesive compositions comprising polymerisable acrylate ester monomer and a free radical initiator.

It has surprisingly been found that the inclusion of a dibasic acid or dibasic acid anhydride in an adhesive composition comprising polymerisable acrylic monomer, a free radical initiator and a thiourea compound considerably increases the tensile shear strength of an adhesive bond formed on zinc plated surfaces.

The invention provides in one of its aspects a method of forming an adhesive bond between substrates at least one of which comprises a surface of zinc, comprising applying to one or more of the substrates to be bonded an adhesive composition comprising a polymerisable acrylate ester monomer material, a free radical initiator, a thiourea compound, and a dibasic acid compound which comprises an organic dibasic acid or an organic dibasic acid anyhydride, and bringing the substrates together to form an adhesive bond.

In a method of forming an adhesive bond according to the invention, it is preferred to use an adhesive composition in two parts, a first part comprising a major amount of polymerisable acrylate ester monomer material and the free radical initiator and a second part comprising a major amount of polymerisable acrylate ester monomer material and the thiourea compound. It is also preferred to include the dibasic acid compound in the part of the composition which contains the thiourea compound, as inclusion of the acid in the part of the composition containing the free radical initiator may lead to a loss in storage stability of that part. The two part adhesive composition, in such a method, may be applied to substrates, at least one of which comprises a zinc surface in a variety of ways. In particular one may employ a right/left application i.e. the first part of the composition is applied to a first one of the substrates and the second part of the composition is applied to a second one of the substrates and the two substrates then brought together to form an adhesive bond. Alternatively, the two parts of the adhesive composition may be admixed prior to application to the substrates to be bonded, the composition then being applied to one or both surfaces before the substrates are pressed together to form the bond. In a method according to the invention the first and second parts of the adhesive composition may generally be employed in any convenient ratio, however we prefer to use them in equal parts.

An adhesive composition for use in a method according to the invention comprises a polymerisable acrylate ester monomer material, a free radical initiator, a thiourea compound and a dibasic acid compound which comprises an organic dibasic acid or an organic dibasic acid anhydride. The polymerisable acrylate ester monomer material for use in an adhesive composition in a method according to the invention may comprise one or more polymerisable acrylate ester monomers which may be admixed to form a homogeneous blend of monomeric material. Polymerisable acrylate ester monomers which may be employed include mono-, di- and polyfunctional acrylates and methacrylates and mixtures thereof, the methacrylates being generally preferred. Suitable acrylates and methacrylates include the well known monoacrylate esters for example methyl methacrylate, tetrahydrofurfuryl methacrylate, hydroxyethyl methacrylate, hydroxypropyl methacrylate, and the well known dimethacrylates for example triethylene glycol dimethacrylate and tetraethylene glycol dimethacrylate. In order to achieve good bond strengths we prefer to use significant amounts of polar monoacrylates, and a minor amount of diacrylate as cross linking agent. Preferably the adhesive composition includes a mixture of acrylate ester monomers comprising monomer (a) a monofunctional methacrylate of the general formula (i)

in which R is preferably a methyl, ethyl or tetrahydrofurfuryl group;
monomer (b) a hydroxymethacrylate of the general formula (ii)

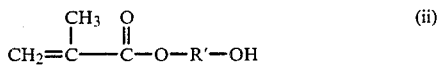

in which R' is preferably an ethylene, propylene or isopropylene group;
and monomer (c) a dimethacrylate of the general formula (iii)

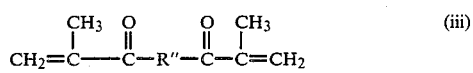

in which R" is preferably derived from ethylene glycol, triethylene glycol or 1.4-butane diol.

Preferably the mixture of acrylate ester monomers contains the monomers (a), (b) and (c) in a ratio of 100 parts monomer (a) to about 50 to about 200 parts monomer (b) and not more than 20 parts monomer (c). We prefer to use methyl methacrylate or tetrahydrofurfuryl methacrylate as monomer (a), hydroxypropyl methacrylate as monomer (b) and triethylene glycol dimethacrylate as monomer (c), and to use these in a ratio of by weight 100:113:16. In a preferred adhesive composition for use in a method according to the invention each part of the adhesive composition comprises about 85% of acrylate ester monomer material by weight of the adhesive composition.

The free radical initiator in a composition used in a method according to the invention preferably comprises a hydroperoxide, peroxides being generally less satisfactory for use as a free radical initiator in adhesive compositions using thiourea compounds as the accelerator. Hydroperoxides which may be employed in such a method include those having the general formula R'''(OOH)n, wherein R''' is a hydrocarbon group containing up to about 18 carbon atoms, more preferably an alkyl, aryl or aralkyl hydrocarbon group containing from 3 to 12 carbon atoms and n is 1, 2 or 3. Examples of suitable hydroperoxides are cumene hydroperoxide and t-butyl hydroperoxide. The free radical initiator may be employed in the adhesive composition up to an extent of 20% by weight of the composition. Excessive amounts of hydroperoxide, however, should be avoided when good strength and durability of the cured composition are required. We prefer to use hydroperoxide up to an extent of 10% by weight of the composition, more preferably 0.1–5% by weight of the composition.

In an adhesive composition for use in a method according to the invention the thiourea compound may comprise any thiourea compound, although preferred compounds include allyl thiourea, diphenyl thiourea, tetramethyl thiourea and ethylene thiourea; of these, we prefer to use ethylene thiourea or allyl thiourea.

In a method according to the invention the thiourea compound accelerates the formation of free radicals from the hydroperoxide to initiate polymerisation of the acrylate ester monomer material. Thus, the amount of thiourea compound employed in the adhesive composition is determined according to the amount of hydroperoxide used. To provide the most advantageous results we prefer to use ethylene thiourea and cumene hydroperoxide in the adhesive composition in a weight ratio of thiourea: peroxide preferably in the range of 1:1 to 1:10, more preferably 1:4. Thus, where the composition comprises cumene hydroperoxide to an extent of 2% by weight of the composition as the free radical initiator, it is desirable to employ ½% by weight of the composition of ethylene thiourea. It is preferred to use the thiourea compound up to an extent of 1% by weight of the composition.

An adhesive composition for use in a method of forming an adhesive bond according to the invention also comprises a dibasic acid compound which comprises an organic dibasic acid or an organic dibasic acid anhydride. The dibasic acids or dibasic acid anhydrides employed must be soluble and form a solution with the other liquid components of the adhesive composition. Dibasic acid compounds for use in a method according to the invention include saturated aliphatic dicarboxylic acid compounds, of which preferred materials are succinic acid and succinic acid anhydride, unsaturated aliphatic dicarboxylic acid compounds, of which preferred materials are maleic acid and maleic acid anhydride and aromatic dicarboxylic acid compounds, of which preferred materials are o-phthalic and o-tetrachlorophthalic acids and acid anhydrides. Preferred dibasic acid compounds are, or have the ability to form, anhydrides having a five membered anhydride ring structure for example certain phthalic acids and aliphatic acids having the ability to form intramolecular five membered anhydride rings. The rings may be saturated or unsaturated and substituted or unsubstituted. The anhydride rings are preferably unsubstituted. The most preferred aliphatic dibasic acids are succinic acid and maleic acid, succinic acid being capable of forming an anhydride having a saturated five membered ring and maleic acid being capable of forming an anhydride having an unsaturated five membered ring.

The dibasic acid or dibasic acid anhydride may be employed in any desired amount. It does not appear necessary to employ more than about 2% by weight of the composition but amounts up to about 10% do not appear to have significant deleterious affects. We prefer to employ dibasic acid compound to an extent of 1 to 2% by weight of the composition.

We prefer to include a compatible elastomeric material in a composition for use in a method according to the invention. The elastomeric material is employed to impart flexibility to the final adhesive bond and to enhance the peel strength and tensile shear strength of the bond. By compatibility of materials where used herein in a general sense, we refer to the ability of the materials to become mixed with the other components of the adhesive composition to provide an entirely homogeneous single liquid phase. The compatible elastomeric material may comprise one or more elastomers which may be blended together to form a homogeneous solution. We prefer to use butadiene-acrylonitrile copolymer e.g. Hycar 1472 supplied by B. F. Goodrich, or chlorosulphonated polyethylene polymer supplied by. Du Pont as the compatible elastomeric material. When included in the composition the compatible elastomeric material is employed to an extent of greater than 10% by weight of the composition. In a preferred adhesive composition for use in a method according to the invention the weight ratio of compatible elastomeric material to acrylate ester monomer material is about 15:85.

In addition, a composition for use in a method according to the invention may include minor amounts of additives as known in the art, for example stabilisers which prevent premature polymerisation of the adhesive composition. It is envisaged that an adhesive composition for use in a method according to the invention is substantially free of solvent.

The invention provides in another of its aspects an adhesive composition in two parts comprising polymerisable acrylate ester monomer material, a free radical initiator, a thiourea compound and an acidic compound wherein the acidic compound comprises an organic dibasic acid or an organic dibasic acid anhydride.

A two part adhesive composition according to the invention preferably comprises a first part comprising a major amount of polymerisable acrylate ester monomer material and the free radical initiator and a second part comprising a major amount of polymerisable acrylate ester monomer material, the thiourea compound and the dibasic acid compound. It is also preferred to include a compatible elastomeric material, for example butadiene-acrylonitrile copolymer or chlorosulphonated polyethylene polymer in an adhesive composition according to the invention.

In a preferred two part adhesive composition according to the invention the first part comprises polymerisable acrylate ester monomer material, comprising monomer (a), a monofunctional methacrylate of the general formula (i)

in which R is a methyl, ethyl or tetrahydrofurfuryl group;
monomer (b) a hydroxymethacrylate of the general formula (ii)

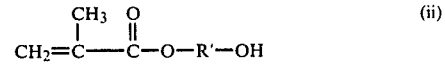

in which R' is an ethylene, propylene or isopropylene group;
and monomer (c) a dimethacrylate of the general formula (iii)

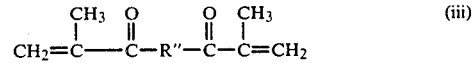

in which R" is derived from ethylene glycol, triethylene glycol or 1,4-butane diol; monomers (a), (b) and (c) being employed in a ratio of 100 parts monomer (a) to 50 to 200 parts monomer (b) and not more than 20 parts monomer (c). The first part, in a preferred composition also comprises greater than 10% by weight of the first part of compatible elastomeric material and 0.1 to 5% by weight of the adhesive composition free radical initiator. The second part, in a preferred two part adhesive composition, comprises polymerisable acrylate ester monomer material, monomers (a), (b) and (c) (as hereinabove defined) being employed in a ratio of 100 parts monomer (a) to 50 to 200 parts monomer (b) and not more than 20 parts monomer (c). The second part, in a preferred composition also comprises greater than 10% by weight of the second part of compatible elastomeric material, up to 1% by weight of the adhesive composition of thiourea compound and 0.1 to 10% by weight of the adhesive composition of dibasic acid compound. The components i.e. the acrylate ester monomer material, free radical initiator, thiourea compound, dibasic acid compound and elastomeric material, suitable for use in the formulation of a two part adhesive composition according to the invention, are preferably as described hereinabove with reference to the adhesive composition for use in a method according to the invention.

The two part adhesive composition may be cured by bringing the parts together. We believe this is sufficient, without application of heat, light or other radiation to bring about curing of the composition as a result of reaction of the thiourea compound with the free radical initiator to produce free radicals which initiate polymerisation of the acrylate ester monomer material. An adhesive bond may be formed between two substrates either by applying each part of the adhesive composition to a separate surface and then bringing the substrates together to form the bond, or by admixture of both parts of the adhesive composition prior to application to one or both of the substrates to be bonded and then applying the composition to one or both surfaces before bringing the substrates together. The parts may generally be used in any convenient ratio to form an adhesive bond, however with the preferred compositions we prefer to use th first and second parts in equal parts by weight of the composition.

In order that the invention may become more clear there now follows by way of example detailed descriptions of sixteen illustrative adhesive compositions and of a method of forming an adhesive bond between substrates at least one of which comprises a surface of zinc, each of which illustrative adhesive compositions and method is provided by the invention and illustrative thereof. It is to be clearly understood that the illustrative adhesive compositions and the illustrative method have been selected for description to illustrate the invention by way of example only and are not by way of limitation thereof.

The illustrative adhesive compositions are illustrative of adhesive composition aspects of the invention and are intended for use in a method of forming an adhesive bond according to the invention between substrates at least one of which comprises a surface of zinc.

The illustrative adhesive compositions comprised two parts, a first part comprising polymerisable acrylate ester monomer material, a compatible elastomeric material and a free radical initiator, and a second part comprising a polymerisable acrylate ester monomer material, a compatible elastomeric material, a thiourea compound and a dibasic acid compound. The illustrative compositions were prepared from masterbatch adhesive compositions A and B having formulations as follows:

|  | Parts by weight |
|---|---|
| Masterbatch Adhesive Composition A |  |
| Part 1 |  |
| Basic adhesive Formulation A | 100 |
| Cumene hydroperoxide | 5 |
| Part 2 |  |
| Basic adhesive Formulation A | 100 |
| Ethylene thiourea | 0.8 |
| Basic Adhesive Formulation A |  |
| Methyl methacrylate | 37 |
| Hydroxypropyl methacrylate | 42 |
| Triethylene glycol dimethacrylate | 6 |
| Butadiene-acrylonitrile copolymer | 15 |
| Stabiliser | 1 |

|  | Parts by weight |
|---|---|
| Masterbatch Adhesive Composition B |  |
| Part 1 |  |
| Basic adhesive Formulation B | 100 |
| Cumene hydroperoxide | 5 |
| Part 2 |  |
| Basic adhesive Formulation B | 100 |
| Ethylene thiourea | 0.8 |
| Basic Adhesive Formulation B |  |
| Tetrahydrofurfuryl methacrylate | 37 |
| Hydroxypropyl methacrylate | 42 |
| Triethylene glycol dimethacrylate | 6 |
| Butadiene-acrylonitrile copolymer | 15 |
| Stabiliser | 1 |

Basic adhesive formulation A was prepared by mixing the polymerisable acrylate ester monomer material with the stabiliser to form a homogeneous solution. The compatible elastomeric material was then added to the solution portionwise. This basic adhesive formulation was then divided into equal parts. Five parts by weight of cumene hydroperoxide was added to 100 parts by weight of the basic adhesive formulation to form Part 1 of the Masterbatch adhesive composition A, and 0.8 parts by weight of ethylene thiourea was added to 100 parts by weight of the basic adhesive formulation to form Part 2 of the Masterbatch adhesive composition A. Each of the parts was stored under anaerobic conditions in separate plastic containers.

Parts 1 and 2 of Masterbatch adhesive composition B were prepared in a similar way.

Various illustrative adhesive compositions were prepared from the Masterbatch adhesive compositions by addition of amounts of dibasic acids and dibasic acid anhydrides as shown in Table 1 to Part 2 of the Masterbatch adhesive compositions. Sample adhesive bonds were prepared using the illustrative adhesive compositions in the illustrative method in the following way.

The first and second parts of the adhesive composition were applied as beads of composition to first and second zinc substrates respectively. The two substrates were brought together immediately and the beads of composition spread generally between the surfaces to be adhered to form an adhesive layer of approximately 0.1 to 0.2 mm, by squeezing or pressing the substrates together. The bond was sufficiently cured after 5 to 15 minutes to allow the samples to be handled. The adhesive composition was substantially completely cured after 24 hours.

The sample bonds were aged for 24 hours and then subjected to tensile shear strength tests carried out according to DIN 53283 and ASTM D 1002. The tensile shear strength tests were carried out accordingly to the following conditions:

Dimensions of test specimens: 100×25×1.5 mm
Bonded area: 300 square mm
Pretreatment of test specimens; solvent degreasing. With steel specimens, sandblasting;
Crosshead speed: 10 mm per minute;
Evaluation: average of five test values measured in N per square mm.

The results are shown in Table 3.

By way of comparison the tensile shear strength tests were also carried out on samples prepared and aged in a similar way using two part adhesive compositions prepared from the Masterbatch adhesive compositions by addition of amounts of various monobasic carboxylic acids as shown in Table 2. Results of these tests are also shown in Table 3.

TABLE 1

| Example adhesive composition | Masterbatch | Dibasic Acid Compound | Amount of Dibasic Acid compound |
|---|---|---|---|
| Illustrative First | B | o-tetrachloro-phthalic acid | 2% |
| Illustrative second | B | o-phthalic acid | 2% |
| Illustrative third | B | maleic acid | 2% |
| Illustrative fourth | B | succinic acid | 1% |
| Illustrative fifth | B | succinic acid | 2% |
| Illustrative sixth | B | succinic acid | 2% |
| Illustrative seventh | B | succinic acid | 2% |
| Illustrative eight | A | succinic acid | 2% |
| Illustrative ninth | B | succinic acid | 2% |
| Illustrative tenth | B | o-phthalic acid anhydride | 2% |
| Illustrative | B | maleic acid | 2% |

TABLE 1-continued

| Example adhesive composition | Masterbatch | Dibasic Acid Compound | Amount of Dibasic Acid compound |
|---|---|---|---|
| Illustrative eleventh | B | anhydride succinic acid anhydride | 2% |
| Illustrative twelfth | B | adipic acid | 2% |
| Illustrative thirteenth | B | azelaic acid | 2% |
| Illustrative fourteenth | B | sebacic acid | 2% |
| Illustrative fifteenth | B | isophthalic acid | 2% |
| Illustrative sixteenth | | | |

TABLE 2

| Adhesive composition | Masterbatch | Monobasic acid | Amount of Dibasic Acid |
|---|---|---|---|
| Comparative 1 | B | nil | — |
| Comparative 2 | B | trichloroacetic | 2% |
| Comparative 3 | B | cyanoacetic | 2% |
| Comparative 4 | B | acetic | 2% |
| Comparative 5 | B | benzoic | 2% |
| Comparative 6 | B | crotonic | 2% |
| Comparative 7 | B | methacrylic | 2% |
| Comparative 8 | A | methacrylic | 2% |
| Comparative 9 | B | acrylic | 2% |
| Comparative 10 | B | methacrylic | 2% |
| Comparative 11 | B | methacrylic | 2% |

TABLE 3

| Adhesive composition | Tensile shear strength on: Zinc plated steel | Steel |
|---|---|---|
| Illustrative first | 7.1 Nmm$^{-2}$ | 18.9 Nmm$^{-2}$ |
| Illustrative second | 7.1 Nmm$^{-2}$ | — |
| Illustrative third | 11.1 Nmm$^{-2}$ | — |
| Illustrative fourth | 11.7 Nmm$^{-2}$ | — |
| Illustrative fifth | 13.1 Nmm$^{-2}$ | — |
| Illustrative sixth | 11.9 Nmm$^{-2}$ | — |
| Illustrative seventh | 10.1 Nmm$^{-2}$ | 22.1 Nmm$^{-2}$ |
| Illustrative eighth | 8.8 Nmm$^{-2}$ | 24.1 Nmm$^{-2}$ |
| Illustrative ninth | 13.4 Nmm$^{-2}$ | 22.0 Nmm$^{-2}$ |
| Illustrative tenth | 10.6 Nmm$^{-2}$ | — |
| Illustrative eleventh | 10.0 Nmm$^{-2}$ | — |
| Illustrative twelfth | 9.1 Nmm$^{-2}$ | — |
| Illustrative thirteenth | 4.1 Nmm$^{-2}$ | 23.4 Nmm$^{-2}$ |
| Illustrative fourteenth | 3.2 Nmm$^{-2}$ | 22.2 Nmm$^{-2}$ |
| Illustrative fifteenth | 2.9 Nmm$^{-2}$ | 21.3 Nmm$^{-2}$ |
| Illustrative sixteenth | 4.6 Nmm$^{-2}$ | 23.7 Nmm$^{-2}$ |
| Comparative 1 | 1.6 Nmm$^{-2}$ | 18.0 Nmm$^{-2}$ |
| Comparative 2 | 2.2 Nmm$^{-2}$ | 14.1 Nmm$^{-2}$ |
| Comparative 3 | 0.4 Nmm$^{-2}$ | 4.1 Nmm$^{-2}$ |
| Comparative 4 | 0.2 Nmm$^{-2}$ | 0.4 Nmm$^{-2}$ |
| Comparative 5 | 0.4 Nmm$^{-2}$ | 22.6 Nmm$^{-2}$ |
| Comparative 6 | 0.2 Nmm$^{-2}$ | 19.1 Nmm$^{-2}$ |
| Comparative 7 | 1.1 Nmm$^{-2}$ | 23.6 Nmm$^{-2}$ |
| Comparative 8 | 0.8 Nmm$^{-2}$ | 23.7 Nmm$^{-2}$ |
| Comparative 9 | 0.2 Nmm$^{-2}$ | 21.6 Nmm$^{-2}$ |
| Comparative 10 | 1.1 Nmm$^{-2}$ | 23.6 Nmm$^{-2}$ |
| Comparative 11 | 0.2 Nmm$^{-2}$ | 18.0 Nmm$^{-2}$ |

The results shown in Table 3 provide a comparison between the effect of adding dibasic acid or dibasic acid anhydride and adding monobasic acid to the adhesive compositions. As can be seen from Table 3, the inclusion of dibasic acid or dibasic acid anhydride as compared to the use of monobasic acid in the example adhesive compositions provides a substantial improvement in the tensile shear strength of bonds formed on zinc plated steel. As can be seen from Table 3 those illustrative adhesive compositions which included o-tetrachlorophthalic acid, o-phthalic acid, maleic acid, succinic acid, phthalic acid anhydride, maleic acid anhydride or succinic acid anhydride gave particularly good results in respect of the tensile shear strength of adhesive bonds obtained on zinc surfaces, with compositions which included succinic acid or maleic acid or phthalic anhydride demonstrating significantly good results.

Table 4 shows comparative results between the inclusion in the example adhesive compositions of 2% by weight of the composition monobasic acid i.e. methacry.lic acid (comparative adhesive compositions 7 and 8) and the inclusion of 2% by weight of the composition dibasic acid i.e. succinic acid (illustrative seventh and eighth adhesive compositions), on the tensile shear strengths of adhesive bonds formed between zinc plated steel surfaces and the bonds formed between other metal surfaces. The respective tensile shear strengths of the bonds were carried out by the same method as those carried out for Table 3 after 24 hours. The adhesive bonds were formed by applying beads of part 1 and part 2 of the adhesive composition to first and second substrates respectively and bringing the substrates together. The composition was spread between the surfaces to be adhered by pressing the substrates together to form an adhesive layer of between 0.1 and 0.2 mm thickness.

TABLE 4

| Tensile Shear Strength (N/mm$^2$) on: | Example Adhesive Composition | | | |
|---|---|---|---|---|
| | Comparative 8 | Illustrative 8th | Comparative 7 | Illustrative 7th |
| (a) Cadmium plated Steel | | | 16.3 | 15.3 |
| (b) Steel | 23.7 | 24.1 | 23.6 | 22.1 |
| (c) Stainless Steel | 25.1 | 22.6 | 23.5 | 20.3 |
| (d) Aluminum | 13.2 | 15.2 | 12.8 | 13.8 |
| (e) Zinc plated Steel | 0.8 | 8.8 | 1.1 | 10.1 |

As can be seen from Table 4, whereas the results for the tensile shear strength obtained for bonds formed on cadmium plated steel, steel, stainless steel and aluminium are not significantly changed on replacing the monobasic acid methacrylic acid by a dibasic acid (succinic acid) in the example adhesive compositions, the corresponding results obtained on zinc plated steel are considerably improved by the replacement of methacrylic acid by succinic acid.

I claim:

1. An adhesive composition in two parts comprising:
   (A) a first part which comprises:
   (A1) polymerisable acrylate ester monomer material; and
   (A2) a free radical initiator; and
   (B) a second part which comprises:
   (B1) polymerisable acrylate ester monomer material;
   (B2) a thiourea compound; and
   (B3) in an amount from 0.1 to 10% by weight of the adhesive composition, an organic dibasic acid compound or the anhydride thereof which dibasic compound comprises succinic acid, succinic acid anhydride, maleic acid, maleic acid anhydride, o-phthalic acid, o-phthalic acid anhydride, o-tetrachlorophthalic acid or o-tetrachlorophthalic acid anhydride.

2. An adhesive composition according to claim 1 wherein said thiourea compound is present in an amount up to 1% by weight of the adhesive composition.

3. An adhesive composition according to claim 2 wherein said thiourea compound comprises ethylene thiourea.

4. An adhesive composition according to claim 1 wherein said free radical initiator comprises a hydroperoxide.

5. An adhesive composition according to claim 1 wherein said polymerisable acrylate ester monomer material comprises methyl methacylate, hydroxy propyl methacrylate, triethylene glycol dimethacrylate or tetrahydrofurfurylmethacrylate.

6. An adhesive composition according to claim 1 further comprising a compatible elastomeric material in a weight ratio of elastomeric material to acrylate ester monomer material of about 15:85.

7. An adhesive composition according to claim 6 wherein the compatible elastomeric material comprises butadiene-acrylonitrile copolymer.

8. An adhesive composition according to claim 6 wherein the compatible elastomeric material is employed to an extend of greater than 10% by weight of the adhesive composition.

9. An adhesive composition in two parts comprising:
(A) a first part which comprises:
  (A1) polymerisable acrylate ester monomer material comprising:
    (i) monomers (a) of the general formula (i)

(i)

in which R is a methyl, ethyl or tetrahydrofurfuryl group;
    (ii) monomer (b), a hydroxymethacrylate of the general formula (ii):

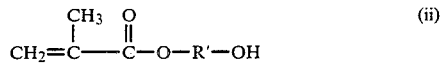

(ii)

in which R' is an ethylene, propylene or isopropylene group; and
    (iii) monomer (c), a dimethacrylate of the general formula (iii)

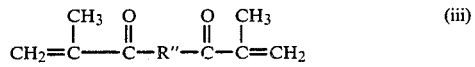

(iii)

in which R" represents a radical of a dihydric alcohol and is derived from ethylene glycol, triethylene glycol or 1, 4-butane diol;
    said monomer material being employed in a ratio of 100 parts monomer (a) to 50 to 200 parts monomer (b) and not more than 20 parts monomer (c);
  (A2) 0.1 to 5% by weight of the adhesive composition of a free radical initiator; and
  (A3) a compatible elastomeric material in a weight ratio of elastomeric material to acrylate ester monomer material of about 15:85; and
(B) a second part which comprises:
  (B1) polymerisable acrylate ester monomer material comprising:
    (i) monomers (a) of the general formula (i)

(i)

in which R is a methyl, ethyl or tetrahydrofurfuryl group;
    (ii) monomer (b), a hydroxymethacrylate of the general formula (ii):

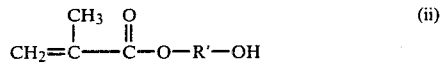

(ii)

in whihc R' is an ethylene, propylene, or isopropylene group; and
    (iii) monomer (c), a dimethacrylate of the general formula (iii)

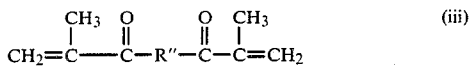

(iii)

in which R" is derived from ethylene glycol, triethylene glycol or 1.4 butane diol;
  said monomer material being employed is a ratio of 100 parts monomer (a) to 50 to 200 parts monomer (b) and not more than 20 parts monomer (c);
  (B2) a thiourea compound, in an amount up to 1% by weight of the adhesive composition;
  (B3) a compatible elastomeric material in a weight ratio of elastomeric material to acrylate ester monomer material of about 15:85; and
  (B4) 0.1 to 10% by weight of the adhesive composition of an organic dibasic acid compound or the anhydride thereof which dibasic compound comprises succinic acid, succinic acid anhydride, maleic acid, maleic acid anhydride, o-phthalic acid, o-phthalic acid anhydride, o-tetrachlorophthalic acid or o-tetrachlorophthalic acid anhydride.

* * * * *